(12) United States Patent
Kohlmeier et al.

(10) Patent No.: US 10,460,011 B2
(45) Date of Patent: Oct. 29, 2019

(54) ENHANCED DOCUMENT SERVICES

(71) Applicant: Microsoft Technology Licensing, LLC, Redmond, WA (US)

(72) Inventors: Bernhard Kohlmeier, Seattle, WA (US); Pradeep Chilakamarri, Seattle, WA (US); Chenguang Yang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/009,748

(22) Filed: Jan. 28, 2016

(65) Prior Publication Data

US 2017/0060813 A1 Mar. 2, 2017

Related U.S. Application Data

(60) Provisional application No. 62/212,294, filed on Aug. 31, 2015.

(51) Int. Cl.
| | |
|---|---|
| *G06F 17/21* | (2006.01) |
| *G06F 17/22* | (2006.01) |
| *G06F 3/0481* | (2013.01) |
| *G06F 3/0484* | (2013.01) |
| *G06F 17/24* | (2006.01) |
| *G06F 17/27* | (2006.01) |

(52) U.S. Cl.
CPC .......... *G06F 17/211* (2013.01); *G06F 3/0481* (2013.01); *G06F 3/0484* (2013.01); *G06F 17/2288* (2013.01); *G06F 17/24* (2013.01); *G06F 17/274* (2013.01)

(58) Field of Classification Search
CPC ........................................................ G06F 17/21
USPC .......................................................... 715/256
See application file for complete search history.

(56) References Cited

U.S. PATENT DOCUMENTS

| | | | |
|---|---|---|---|
| 5,812,126 A | 9/1998 | Richardson et al. | |
| 7,424,674 B1 | 9/2008 | Gross et al. | |
| 7,561,734 B1 | 7/2009 | Wnek | |
| 7,584,128 B2 * | 9/2009 | Mason | G06Q 10/10 382/137 |
| 7,657,511 B2 | 2/2010 | Brookler et al. | |
| 8,898,595 B2 | 11/2014 | Cragun et al. | |
| 8,972,394 B1 * | 3/2015 | Tong | G06F 17/3071 707/728 |

(Continued)

FOREIGN PATENT DOCUMENTS

EP 1077421 A2 2/2001

OTHER PUBLICATIONS

"Rewordify Text", Published on: Mar. 10, 2015 Available at: https://rewordify.com/.

(Continued)

*Primary Examiner* — Andrew R Dyer
*Assistant Examiner* — Tionna M Burke

(57) ABSTRACT

A document lens service identifies an end-user targeted to consume a productivity document being authored in a user interface to a productivity application. The service then also identifies a document profile specific to the end-user indicative of a model document for the end-user to consume. While the productivity document is being authored, suggestions may be surfaced in the user interface for aligning the productivity document with the model document.

20 Claims, 9 Drawing Sheets

(56) References Cited

U.S. PATENT DOCUMENTS

| | | | |
|---|---|---|---|
| 2002/0174125 A1* | 11/2002 | Lucovsky | G06F 21/6218 |
| 2004/0019855 A1* | 1/2004 | Purvis | G06F 17/243 |
| | | | 715/230 |
| 2004/0030540 A1 | 2/2004 | Ovil et al. | |
| 2004/0119714 A1 | 6/2004 | Everett et al. | |
| 2004/0253568 A1 | 12/2004 | Shaver-Troup | |
| 2006/0069728 A1 | 3/2006 | McEvilly et al. | |
| 2006/0139312 A1* | 6/2006 | Sinclair, II | G06F 3/0481 |
| | | | 345/156 |
| 2006/0166174 A1 | 7/2006 | Rowe et al. | |
| 2007/0260448 A1 | 11/2007 | Lorenzen et al. | |
| 2009/0292987 A1 | 11/2009 | Sorenson | |
| 2009/0327883 A1 | 12/2009 | Robertson et al. | |
| 2011/0179061 A1 | 7/2011 | Chilakamarri et al. | |
| 2013/0346843 A1* | 12/2013 | Murray | G11B 27/34 |
| | | | 715/212 |
| 2014/0033007 A1 | 1/2014 | Mhatre | |
| 2014/0325407 A1 | 10/2014 | Morris et al. | |
| 2015/0120700 A1 | 4/2015 | Holm et al. | |
| 2015/0278196 A1* | 10/2015 | Dua | G06F 17/2785 |
| | | | 704/9 |

OTHER PUBLICATIONS

"Link or Embed Data", Retrieved on: Jul. 23, 2015 Available at: https://support.office.com/en-in/article/Link-or-embed-data-cf1c1ba3-03d1-44d5-a24a-f01a752c57b5.

Hu, et al., "Automatic Extraction of Titles from General Documents Using Machine Learning", In Proceedings of the 5th ACM/IEEE-CS Joint Conference on Digital Libraries, Jun. 7, 2005, pp. 145-154.

Bradley, H., "How to Enter Web Data into Microsoft Excel", Published on: Mar. 12, 2012 Available at: http://www.smallbusinesscomputing.com/biztools/how-to-enter-web-data-into-microsoft-excel.html.

Abrahamsson, et al., "Medical Text Simplification Using Synonym Replacement: Adapting Assessment of Word Difficulty to a Compounding Language", In Proceedings of the 3rd Workshop on Predicting and Improving Text Readability for Target Reader Populations, Apr. 26, 2014, pp. 57-65.

"Office Graph—The Intelligent Fabric to Office 365 Data", Retrieved on: Jul. 23, 2015 Available at: http://dev.office.com/officegraph.

"Query the Office graph using GQL and SharePoint Online Search REST APIs", Published on: Nov. 6, 2014 Available at: https://msdn.microsoft.com/en-us/office/office365/howto/query-Office-graph-using-gql-with-search-rest-api.

"International Search Report and Written Opinion Issued in PCT Application No. PCT/US2016/049341", dated November 18, 2016, 12 Pages.

"International Preliminary Report on Patentability Issued in PCT Application No. PCT/US2016/049341", dated November 29, 2017, 9 Pages.

"Second Written Opinion Issued in PCT Application No. PCT/US2016/049341", dated Sep. 6, 2017, 8 Pages.

"Non Final Office Action Issued in U.S. Appl. No. 15/009,754", dated Mar. 22, 2018, 15 Pages.

"Final Office Action Issued in U.S. Appl. No. 15/009,754", dated Oct. 16, 2018, 15 Pages.

\* cited by examiner

ENHANCED DOCUMENT SERVICES

RELATED APPLICATIONS

This application is related to and claims priority to U.S. Patent Application No. 62/212,294, filed on Aug. 31, 2015, entitled "Enhanced Document Services," and which is hereby incorporated by reference in its entirety.

TECHNICAL BACKGROUND

Producing an effective electronic document is a challenging task for even the most gifted writer. A variety of software tools have existed for a long time that may increase an author's productivity while also improving the aesthetics of a document, such as spell-checking and template tools. But no matter how well intended an author may be, many scenarios exist where a resulting document is passed over, skimmed, or otherwise fails to have an impact on the end-user consuming it.

In many cases, a document may lack impact due to having characteristics that are inconsistent with the preferences and limitations of the end-user consumer. For example, a word processing document written in a semantically complex manner in one language may be difficult for an end-user to consume whose primary language is not the same. In another example, the font, spacing, and other layout characteristics of a document may make it difficult to consume for a dyslexic end-user.

From a more technical perspective, computing and communication resources are wasted when ineffective documents are produced. Emails that someone took time and processing resources) to produce are deleted, attachments are ignored, and storage space and bandwidth is consumed in the meantime. In the aggregate, less-than-effective electronic documents strain both the productive capacity of humans and technology alike, and from both the authoring and consuming perspectives of document production and consumption.

Overview

Enhanced document services technology is disclosed herein improves the productive capacity of end-users and computing resources alike, in the context of authoring and consuming electronic documents. In an implementation, a document lens service identifies an end-user targeted to consume a productivity document being authored in a user interface to a productivity application. The service then also identifies a document profile specific to the end-user indicative of a model document for the end-user to consume. While the productivity document is being authored, suggestions may be surfaced in the user interface for aligning the productivity document with the model document.

In another implementation, the document lens service identifies a document profile specific to an end-user that is indicative of a model document for the end-user, when a productivity document is opened to be consumed by the end-user in a user interface to a productivity application, the service modifies the productivity document based at least on the document profile to align the productivity document with the model document. The productivity document is then rendered as-modified in the user interface.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Technology is disclosed herein for enhancing the document production and consumption experience. An enhanced document service provides the capability to modify word processing documents, emails, and other content on-the-fly so that their presentation is more effective form the standpoint of the consumer. Technical effects that may be realized include the increased utilization of computing and communication resources as documents that are produced are more likely to be read, forwarded, commented, and otherwise consumed. Authoring an effective document may take less time when the author is guided by a lens profile and the consumption experience may be improved when assisted by a lens.

Figure 1:
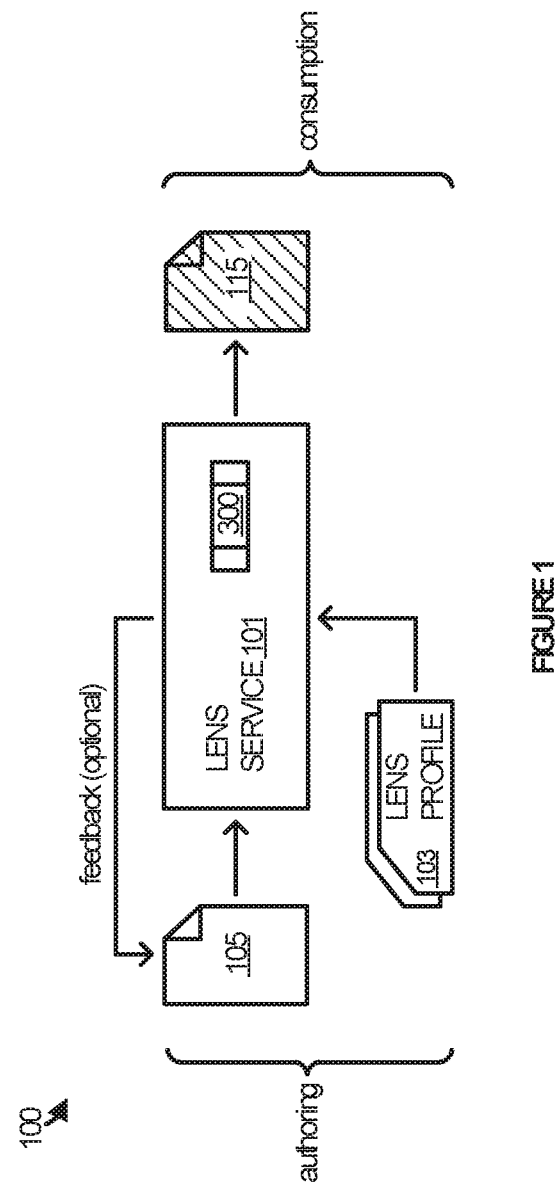
FIG. 1 illustrates an operational scenario in an implementation of enhanced document services.

FIG. 1 illustrates an operational scenario 100 in an implementation of enhanced document services. Operational scenario 100 involves lens service 101 and lens profile 103. Lens service 101 is representative of an enhanced document service that applies lens profile 103 to document 105, to produce document 115. Document 115 is representative of an enhanced document.

Figure 9:
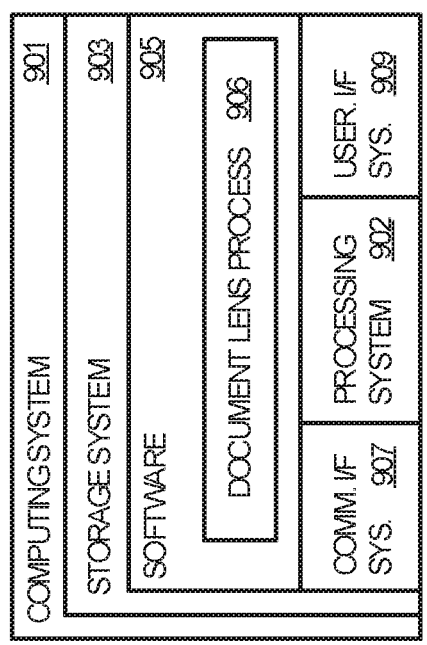
FIG. 9 illustrates a computing system suitable for implementing the enhanced document services technology disclosed herein, including any of the architectures, elements, processes, and operational scenarios and sequences illustrated in the Figures and discussed below in the Technical Disclosure.

Lens service 101 is representative of any software service capable of employing document lens process 300. Lens service 101 may be integrated with another service or services such as productivity, email, or other software services) or may be implemented as a stand-alone service. In some scenarios lens service 101 may be integrated in the context of a local application, either as an integrated component of the application or as an add-on to the application. Lens service 101 may be implemented on any suitable computing system or systems, of which computing system 901 in FIG. 9 is representative.

Document 105 is representative of any document capable of being processed by lens service 101 in the context of authoring or consumption. Examples of document 105 include, but are not limited to, word processing documents, spreadsheets, presentation documents, emails, blog posts, and micro-blog posts. Document 115 represents a modified version of document 105 that is produced by lens service 101 when employing document lens process 300.

Figure 3:
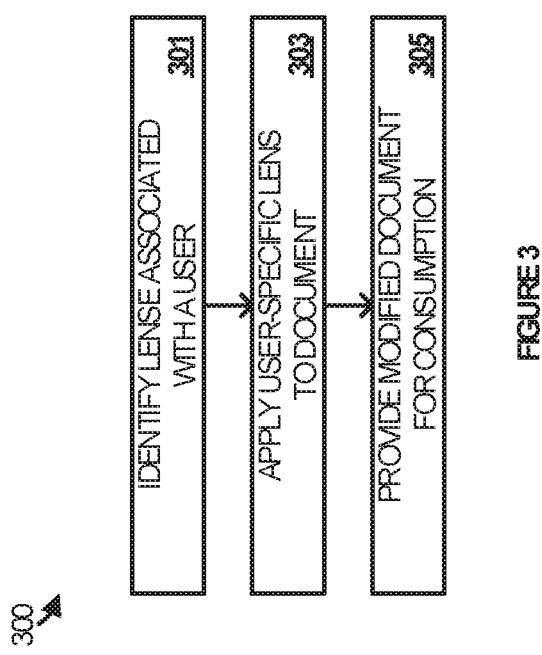
FIG. 3 illustrates a document lens process in an implementation.

Referring parenthetically to the steps illustrated in FIG. 3, in operation lens service 101 identifies a lens profile 103 specific to a user (step 301). The user may be a user targeted for consumption of document 105. The user may be identified by examining a list of recipients in an email or a list of users that share access to document 105, for example. In other scenarios the user may be identified by virtue of being the person to open document 105. Having identified the user, a lens profile specific to the user is retrieved from a lens database or other suitable data store.

The lens profile may comprise data descriptive of content consumption characteristics for the user. For example, the data may describe preferred layouts, fonts, or styles associated with the user's profile. In other examples, the profile may link to a general profile that the user is associated with and has adopted as their own. The general profile may then describe such content characteristics.

Next, lens service 101 applies lens profile 103 to document 105 to produce a modified version of document 105, represented by document 115 (step 303). Lens service 101 modifies document 105 based on the preferred content characteristics identified in lens profile 103 or by an associated general profile. The profiles may include explicit rules for lens service 101 to follow when modifying a document. Alternatively, or in combination, the profiles may serve as input to rules embodied in lens service 101.

Document 115 may then be provided for consumption by an end-user (step 305). Providing document 115 may include communicating it to a local application for rendering and display on a local device. In scenarios where lens service 101 is implemented locally, providing document 115 may include rendering and displaying the document, without having to download the document.

In some scenarios lens service 101 may be capable of providing feedback to the authoring process with respect to document 105. The feedback may include visual hints or suggestions derived by lens service 101 based on the lens profile 103 associated with the end-user consumption target. The authoring user may thus tailor his or her authoring of document 105 to the consumption preferences of the target.

Figure 2:
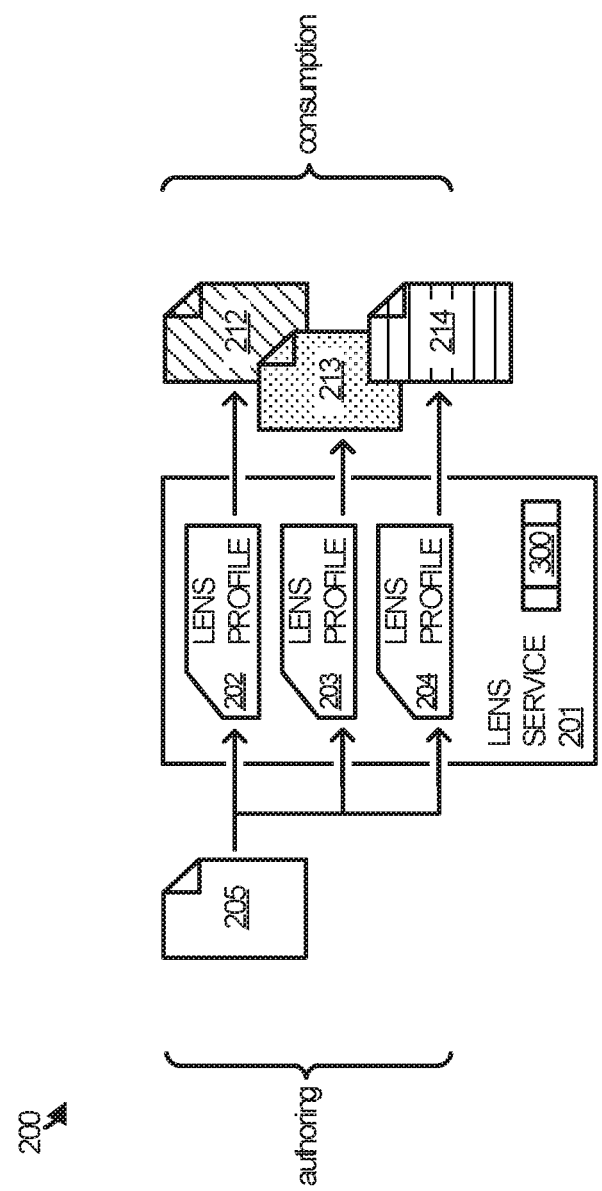
FIG. 2 illustrates another operational scenario in an implementation of enhanced document services.

FIG. 2 illustrates another operational scenario 200 in an implementation. Operational scenario 200 involves lens service 201 and lens profiles 202, 203, and 204. Lens service 101 may apply lens profiles to document 205, to produce multiple variations of the document represented by document 212, document 213, and document 214.

Lens service 201 is representative of any software service capable of employing document lens process 300. Lens service 201 may be integrated with another service or services such as productivity, email, or other software services) or may be implemented as a stand-alone service. In some scenarios lens service 201 may be integrated in the context of a local application, either as an integrated component of the application or as an add-on to the application. Lens service 201 may be implemented on any suitable computing system or systems, of which computing system 901 in FIG. 9 is representative.

Document 205 is representative of any document that is capable of being processed by lens service 101 in the context of authoring or consumption. Examples of document 205 include, but are not limited to, word processing documents, spreadsheets, presentation documents, mails, blog posts, and micro-blog posts. As mentioned, documents 212, 213, and 214 represent modified versions of document 205 that are produced by lens service 201 when employing document lens process 300.

Referring again to the steps illustrated in FIG. 3, in operation lens service 201 identifies a lens profile specific to each user in a group of users step 301). The users may be targeted for consumption of document 205, such as recipients of an email, users in a shared document group, or simply multiple users each individually opening a document. Having identified the users, a lens profile specific to each user is retrieved from a lens database or other suitable data store. In this scenario, it is assumed for exemplary purposes that each user has a different lens, although users may share common lens profiles or coincidentally have similar lens profiles.

Next, lens service 201 applies lens profiles 202, 203, and 204 to document 205 to produce modified versions of document 205, represented by documents 212, 213, and 214 (step 303). Lens service 201 modifies the document based on the preferred content characteristics identified in the lens profiles or by an associated general profile. Documents 212, 213, and 215 may then be provided for consumption by various end-users (step 305).

Figure 4:
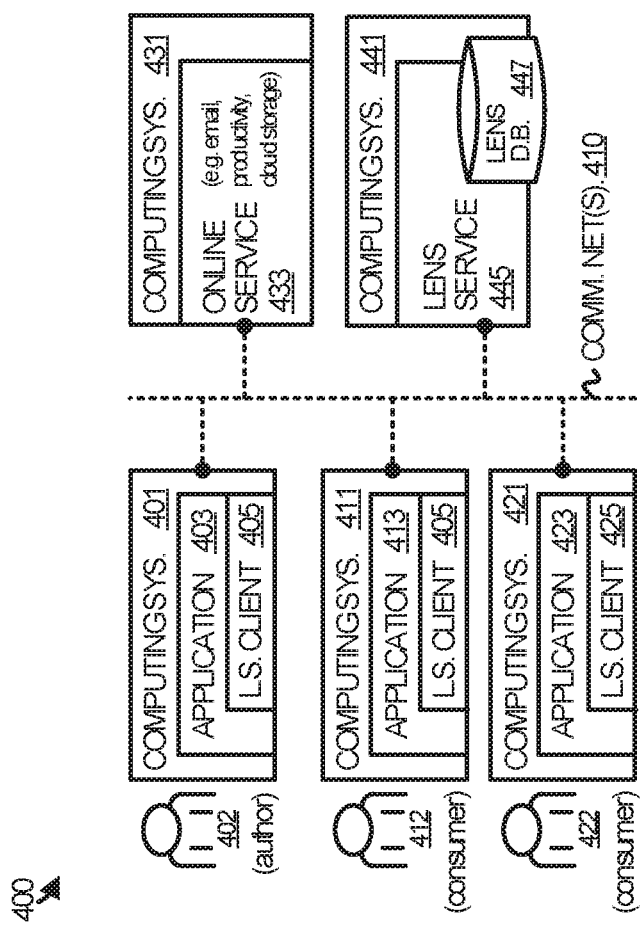
FIG. 4 illustrates an operational architecture in an implementation.

FIG. 4 illustrates an operational architecture 400 suitable for implementing the enhanced document services contemplated herein, such as lens service 101. Operational architecture 400 includes computing system 401, computing system 411, and computing system 421, which host application 403, application 413, and application 423 respectively. Computing system 431 hosts online service 433, while computing system 441 hosts lens service 445. Lens service client 405, lens service client 415, and lens service client 415, running within the context of applications 403, 413, and 423 respectively, interface with lens service 445 to provide enhanced document services. Applications 403, 413, and 423 may communicate with one or more of online service 433 and lens service 445 over communication network 410.

Computing systems 401, 411, and 421 are each representative of any physical or virtual computing resource, or combination thereof, suitable for executing applications 403, 413, and 423, of which computing system 901 in FIG. 9 is representative. Example computing systems include, but are not limited to, desktop computers, laptop computers, tablet computers, mobile phones, phablet devices, wearable devices, virtual machines, and containers, as well as any variation, combination, or collection thereof.

Applications 403, 413, and 423 are each representative of any software application executed on computing system 401, 411, and 421, and through which an end-user may author or consumer electronic documents or other types of content (e.g. video content and voice communications). Examples include, but are not limited to, word processing applications, spreadsheet applications, presentation applications, email applications, web browsers, line-of-business applications, and any other productivity applications, personal information management applications, or variation and combination thereof. Some commercial examples include, but are not limited to, Microsoft® Word, Excel®, PowerPoint®, and Outlook®, as well as the Google Docs™ and iWork® suites.

Applications 403, 413, and 423 may each be a locally installed and executed (native) application, a desktop application, a mobile application, a streamed (or streaming) application, a web-based application that is executed in the context of a web-browser, a program implemented in the context of an abstract computing machine, or any other application or collection thereof capable of supporting electronic documents. Applications 403, 413, and 423 are implemented in program instructions that comprise various software modules, components, and other elements of the application, including lens service clients 405, 415, and 425 respectively. However, one or more of lens service clients 405, 415, and 425 may be implemented as stand-alone clients in some implementations, or integrated with another application or operating system component in other implementations. In some implementations, one or more of lens service clients 405, 415, and 425 may be a downloadable plug-in program or a downloadable add-in program.

In operation, end-users 402, 412, and 424 engage with applications 403, 413, and 423 respectively, to create, edit, and/or consume electronic documents. The end-users may engage with the applications via user interface software and user interface systems supported by computing systems 401, 411, and 421.

The applications 403, 413, and 423 may interface with online service 433 over the course of a user session. For example, an email application may communicate with an email service; a productivity application may communicate with a file storage service; and a media player may communicate with an online video service.

Lens service clients 405, 415, and 425 may drive applications 403, 413, and 423 to communicate with lens service 445 during a user session. For example, a client may communicate with lens service 445 while an end-user acts as an author with respect to a document (e.g. creating, editing). The client may also communicate with online service 433 to handle a document (e.g. open, store, send, or receive). In addition, lens service 445 and online service 433 may communicate with each other to facilitate enhanced document services in some implementations.

Lens service 445 hosts and maintains lens database 447. Lens database 447 is representative of a database or databases that store lens profiles associated with end-users. The profiles may be utilized by lens service 445 to generate recommendations and suggestions for an end-user authoring a document and/or to generate modified documents for end-users consuming a document. Lens service 445 may update the lens profiles as well based on user/group characteristics, behavior, and preferences.

Figure 5:
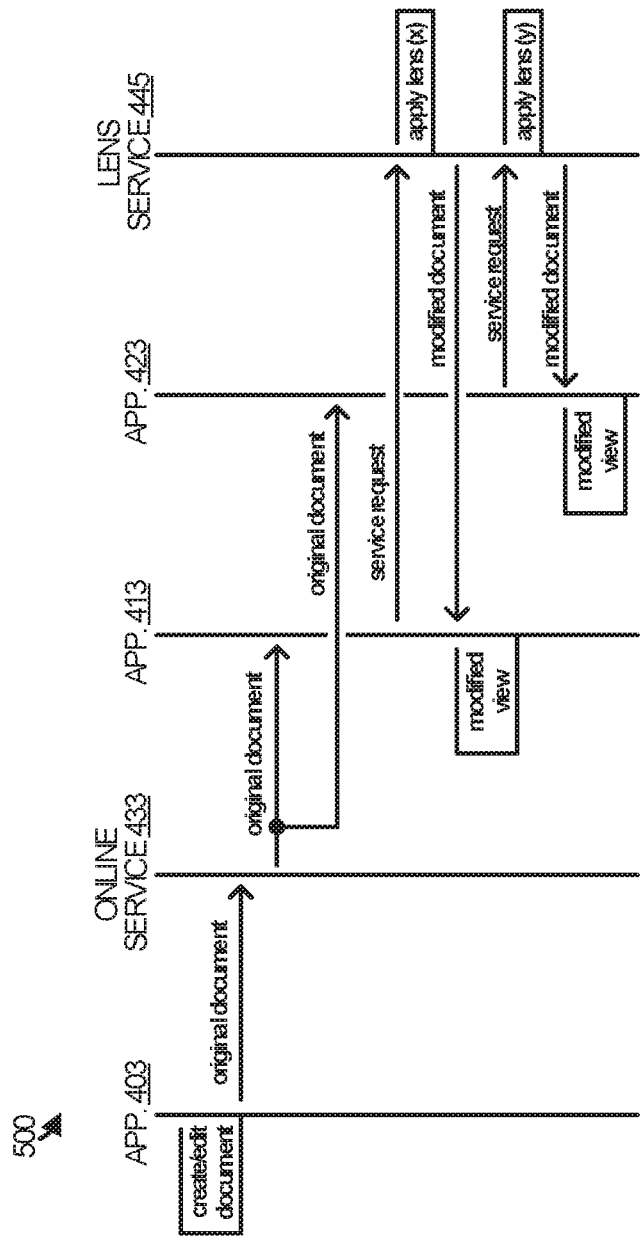
FIG. 5 illustrates an operational sequence in an implementation.

FIG. 5 illustrates operational scenario 500 with respect to operational architecture 400. In this example scenario, end-user 402 acts as an author with respect to an electronic document, while end-users 412 and 422 act as consumers of the document. End-user 402 authors the document (e.g. create and/or edit the document) via application 403. Application 403 provides the document to online service 433, from which it is distributed to applications 413 and 423. In an example where it is assumed that online service 433 is a storage service, online service 433 may store the original document, from which it is retrieved by applications 413 and 423. In an email example, online service 433 might send the document in the context of send and receive operations with applications 413 and 423.

Upon receiving the document in its original form (as authored by end-user 402), application 413 communicates a service request to lens service 445 to apply a lens profile to the document. Lens service 445 retrieves the appropriate lens profile for end-user 412 from lens database 447 and applies the profile to the original document.

The document is analyzed in view of the profile to identify ways in which it differs from a model document for end-user 412. At least one or more of the differences may be manifested in ways that can be modified by lens service 445. Accordingly, lens service 445 produces a modified version of the document that is more aligned with the model document for end-user 412 than the document in its original state.

Modifying the document might entail changing the same instance of the document provided to lens service 445 by application 413. However, lens service 445 might alternatively make a copy of the document in order to modify the copy, rather than the original instance. In some implementations, lens service 445 might not modify the document at all, but might rather provide instructions, meta data, or other such information to application 413, allowing application 413 to modify the document.

Application 413 receives the modified document (or information with which to modify the document) and renders a view of the modified document in its user interface. For example, the document may be included in a document view rendered by a productivity application or in an email view rendered by an email application. End-user 412 may thus more readily consume the document, as it appears closer to his or her model document.

A similar process is carried out with respect to end-user 422. When the original document is retrieved by application 423 from online service 433, application 423 initiates a service request to lens service 445. Lens service 445 retrieves the appropriate lens profile for end-user 422 from lens database 447 and applies the profile to the original document. The document is analyzed in view of the profile to identify ways in which it differs from a model document for end-user 422. Lens service 445 then produces a modified version of the document that is more aligned with the model document for end-user 422 than the document in its original state. As mentioned, modifying the document might entail changing the actual document, modifying a copy of the document, or communicating information to the client application indicative of what changes to make.

Application 423 receives the modified document (or information with which to modify the document) and renders a view of the modified document in its user interface, providing end-user 412 a document more closely aligned with his or her model document.

Figure 6:
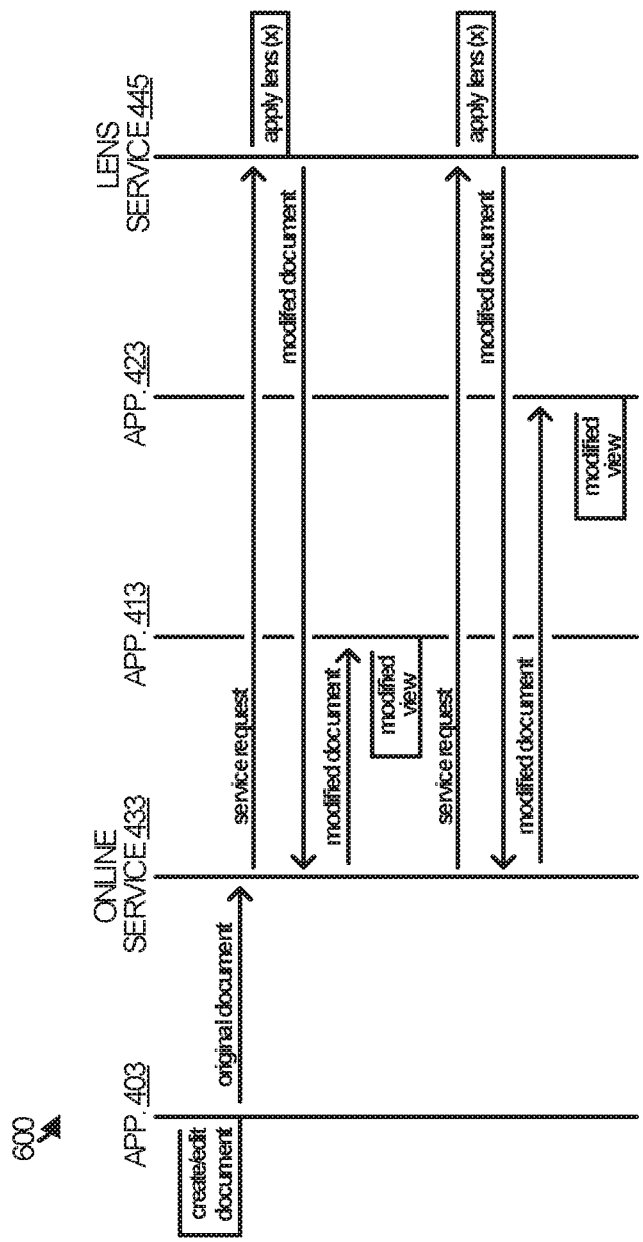
FIG. 6 illustrates another operational sequence in an implementation.

FIG. 6 illustrates operational scenario 600 with respect to operational architecture 400, which differs from operational scenario 500 in at least one aspect. In operational scenario 500, applications 413 and 423 initiate service requests to modify an original document in view of specific lens profiles. In operational scenario 600, online service 433 initiates the service requests.

End-user 402 again acts as an author with respect to an electronic document, while end-users 412 and 422 act as consumers of the document. End-user 402 authors the document (e.g. create and/or edit the document) via application 403 and application 403 provides the document to online service 433. For example, application 403 may store the original document in online service 433. In another example, application 403 may upload the original document to online service 433 in the context of send/receive operations for email.

Upon receiving the document in its original form (as authored by end-user 402), online service 433 initiates a first service request to lens service 445 to apply a lens profile to the document. Lens service 445 retrieves the appropriate lens profile for end-user 412 from lens database 447 and applies the profile to the original document. Online service 433 then provides the modified document to application 413 and application 413 renders a view of the modified document in a user interface for end-user 412 to consume.

Online service 433 also initiates a second service request to lens service 445 to apply a different lens profile the document. Lens service 445 retrieves the appropriate lens profile for end-user 422 from lens database 447 and applies the profile to the original document, as it did for end-user 412. The modified document is returned to online service 433, which communicates it to application 423. Application 423 is able to present the modified document in its user interface for end-user 422 to consume.

Figure 7:
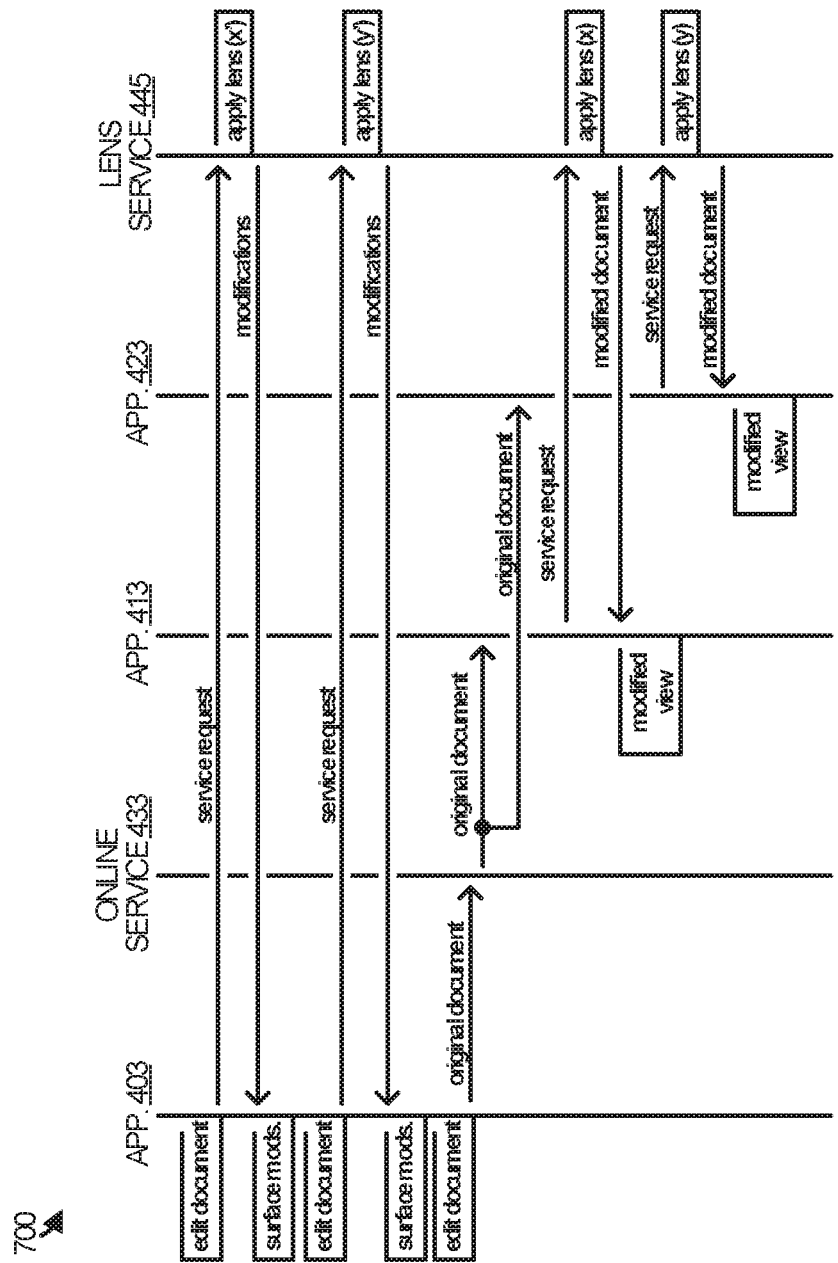
FIG. 7 illustrates another operational sequence in an implementation.

FIG. 7 illustrates another operational scenario (operational scenario 700) with respect to operational architecture 400. In this scenario, end-user 402 receives feedback and suggestions when authoring a document.

To begin, end-user 402 opens, edits, and otherwise creates content in the form of a word processing document, email, or other such work product. While working on the document, application 403 (driven by lens service client 405) communicates a service request to lens service 445. The service request identifies at least one end-user who may be a target consumer for the document, such as an email recipient, a collaborative member of a group, or some other type of consumer.

Lens service 445 receives the service request and responsively looks-up and applies an appropriate lens for the target consumer. In this example, it is assumed that one of the target consumers is end-user 412. The lens profile that lens service 445 retrieves for end-user 412 is represented by the symbol x-prime, to denote that it is a different lens than the lens applied in operational scenario 500 and operational scenario 600. For example, the lens x-prime may be a public lens, whereas the lenses in operational scenarios 500 and 600 may be considered private lenses.

Next, lens service 445 applies the selected lens profile to the original document being produced by application 403. Lens service 445 analyzes the content in view of model document information represented in the lens profile for end-user 412. Differences between the document in its current form and characteristics of a model document expressed in the lens profile may be present, in which case lens service 445 can identify solutions for bringing the current document into greater alignment with the model document for end-user 412. The solutions may be communicated to application 403, to be presented in a user interface as suggestions for modifying the document. End-user 402 may thus consider the suggestions for incorporating into his or her document, potentially increasing the likelihood that end-user 412 consumes and appreciates the document.

A similar process occurs with respect to other end-users associated with the document, e.g. end-user 422. Application 403 communicates another service request to lens service 445 to obtain suggestions relevant to end-user 422. Lens service 445 retrieves and applies a public lens relevant to end-user 422 to arrive at suggested modifications to the document (represented by y-prime). The suggestions are communicated back to application 403, which can then surface them in a user interface to end-user 402. End-user 402 may consider the suggestions and, if implemented, may alter the document to an extent that it becomes more likely that end-user 422 will consumer and appreciate the document.

While two separate service requests are illustrated in FIG. 7, it may be appreciated that a single service request could be initiated by application 403 to obtain suggestions for both targeted consumers. For example, a single service request could identify both end-users, such that lens service 445 could retrieve and apply both lens profiles before returning suggested modifications to application 403. In another alternative, application 403 could wait until it receive replies to both service requests before surfacing any modifications for consideration by end-user 402.

Figure 8:
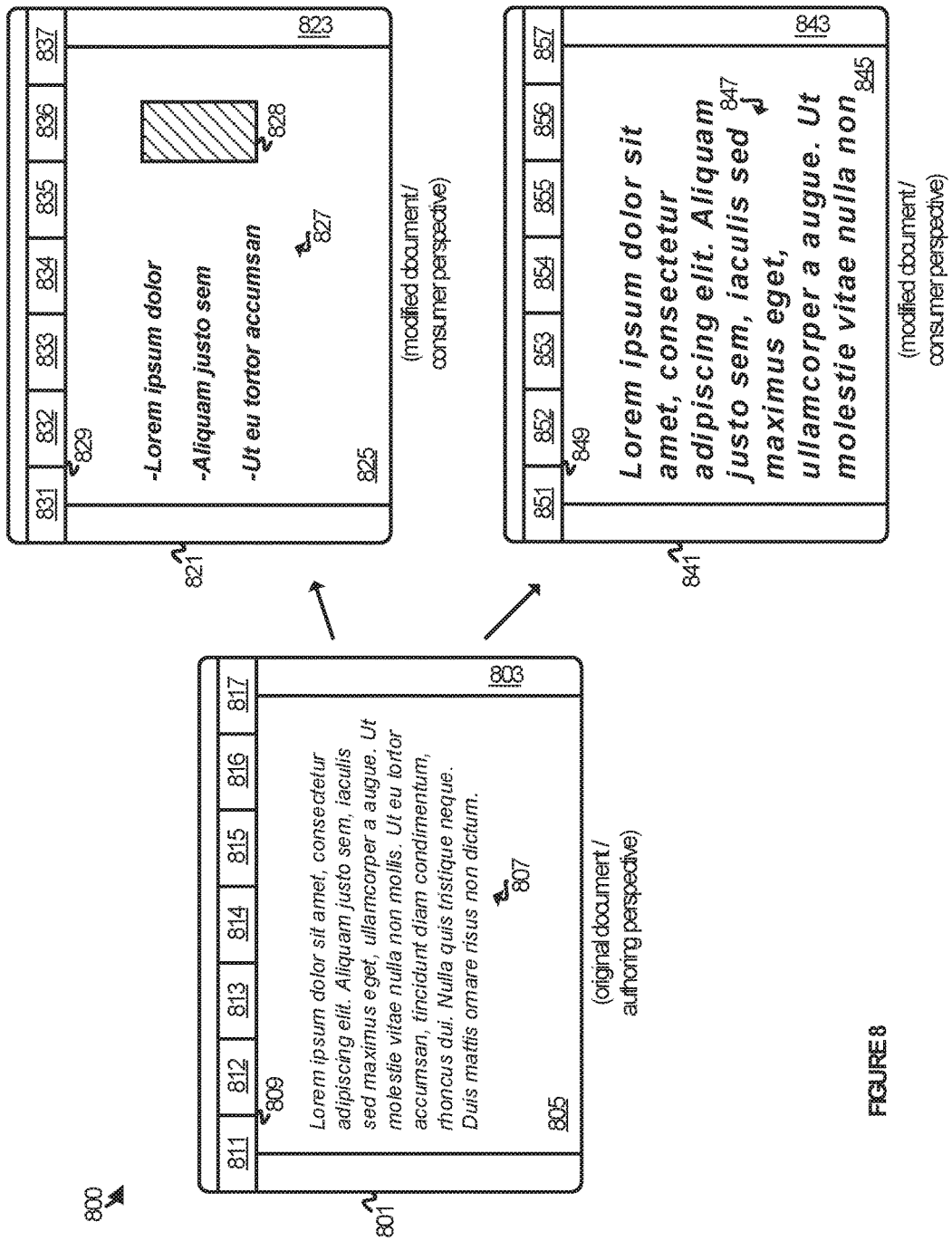
FIG. 8 illustrates a set of document views in an implementation.

FIG. 8 illustrates an example scenario 800 in which a set of document view are provided in an implementation. The document views are representative of an original document and how it might be modified by a document lens service. Example scenario 800 involves at least view 801, view 821, and view 841.

View 801 represents a document from an authoring perspective as experienced in a word processing application. View 821 represents the same document, but from a consumer's perspective. View 841 also represents the document from a consumer's perspective.

View 801 includes a background 803 over which a document canvas 805 is rendered. Text 807 is layered over document canvas 805, although other types of content may be included in addition to or in place of text. View 801 also includes a feature menu 809 in which various menu options, features, or other such elements may be displayed, represented by menu elements 811, 812, 813, 814, 815, 816, and 817.

View 801 represents the view of a document as experienced by an author as he or she edits the document. In accordance with the implementations discussed above, the document can be modified based on an end-user's lens profile to better suit their consumption preferences and needs. Thus, view 821 and 841 differ substantially from view 801.

In view 821, the document is again rendered on a document canvas 825 over a background 823. View 821 includes a feature menu 829 with various menu options 831, 832, 833, 834, 835, 836, and 837. The content rendered on the document canvas 825 includes text 827 and a graphic 828. The text 827 differs from text 807 in view 801 and is representative of a modification that may be made to suit a lens profile. That is, text 807 was analyzed by the document lens service and modified to a bullet-list format preferred by the end-user and is also presented in a different font. Graphic 829 was added to bring the document into greater alignment with a profile.

View 841 provides additional examples of how a document might be modified by a document lens service. View 841 includes a background 843 over which document canvas 845 is displayed. View 841 also includes a feature menu 849 with various menu options 851, 852, 853, 854, 855, 856, and 857.

Document canvas 845 includes text 847. Text 847 is rendered in a different font relative to text 807. The font is larger and has greater spacing relative to text 807, thus making it easier for a given end-user to consume. The font may be a preferred font selected by the end-user or observed over time by the document lens service. The lens service can automatically change fonts to make them easier for the end-user to consume.

Further aspects of enhanced document services may be appreciated from the following exemplary discussion. An enhanced document service as contemplated herein helps authors to maximize the impact of their documents by enabling intended audiences to efficiently unlock the information in a manner that is tailored to their specific backgrounds, skills and abilities.

Through machine learning, an enhanced document service may enable users to communicate across style, language and cognitive barriers. A document lens service may provide 'lenses' through which documents can be viewed. Lenses can be tailored to non-native speakers, readers with dyslexia or audiences that are foreign to the author in other ways. The document lens service may help Office® bridge the gaps between authors and consumers of Office® documents at scale.

Documents convey meaning through a set of semantic rules, figures and pictures. The goal of an author is to convey a message with the maximum impact on the receiver of a document, generating the intended effect on them. Documents may be about driving greater understanding, eliciting change, generating action, or simply about informing or bringing a certain point of view across. All of these goals revolve around the recipient of the document, so in order to create the greatest impact a document needs to 'get through' and be tailored to the audience.

Connecting with the audience is quite a challenge even in situations where the audience of a document has a similar profile to that of the author, but such an idealized situation seldom occurs in real life. Real world situations tend to be trickier, and audiences can often have widely divergent backgrounds and expectations. This divergence might be a result of a large and diverse audience with varying cognitive styles, or a mismatch in subject matter expertise between the author and recipients. Language could be a barrier where the writer or recipients are second language speakers. Lastly, there may be a barrier presented by cognitive and learning disabilities on part of the author or recipient, which make it harder for individuals to process written language. These barriers can only be overcome by understanding the individual recipients of documents, which can be very difficult at authoring time.

An intelligent document service as contemplated herein herein may allow any audience of productivity documents to unlock the information encoded in documents they receive in an optimal way to create the highest impact possible. It may also help authors to specifically target audiences. The service may implement an extensible set of services that act on documents stored in the cloud across verticals like college essays, project proposals, business correspondence, job applications, statements of work, professional looking presentations, contracts etc., and across specific users or user groups. This can include customers, a potential employer, a manager, a child, an ESL reader, or a dyslexic reader.

Consumers of documents may be able to self-identify and to look at a document through their own lens. Lenses may be combined to lead to even higher customization. Lenses are not limited to semantics, but can include high contrast, special fonts, and special font sizes etc. Like lenses on contact lenses, document lenses are not visible to others and may be tailored to the wearer. This allows any user to self-identify without disclosing any facts about themselves or disclosing their preferences to others. Second language users for example may often have a much smaller vocabulary than native speakers of a language. Without disclosing that potentially embarrassing fact, an ESL user may simply apply a reduced vocabulary lens and quickly comprehend a document authored by a native speaker, thus increasing the impact of the document.

Examples for lenses include customizing the stylistic content of a document, such as the wording, ordering of sections, paragraph length, word choice, and grammar to best suit the preferences of the reader.

Graph analytics and other signals technology within various application services (Office 365) may be leveraged in coordination with user self-identification to identify, build, and improve lenses. From the Office Graph, as well as signals from within the Office Applications, a lens service can infer much about how any user consumes information. From there, the service can make targeted optimizations to any given document.

For example, Person A is a manager, and prefers the executive summary first, with more direct verbiage and less fluff. Person B is an IC for a particular area, thus the service may alter a document to go into details and depth on their area, but to only provide high-level summaries for other portions of the document. Person C is a visual learner—the service shows related slide decks and images alongside the executive summary, before the rest of the document.

Improving the accessibility of a document is another area improved upon the service. The service may display the right formatting for the right screen or optimized for any reading impediments (improved line-spacing, font sizes, and word choice for someone with dyslexia; inline definitions for expanded vocabulary terms for an ESL person).

Language is of course the primary medium for communicating ideas within a document, and as such can be a critical barrier between author and reader. Today's 'static' documents place the burden of understanding the audience's language skills entirely on the author at the time of writing. This may often force authors to attempt a one-size-fits-all even when that's impractical. An aim of the service disclosed herein is to build document lenses that allow the language in the document to dynamically tailor itself to the language skills of the recipient. A few examples follow of how these lenses can cut down language barriers.

Identify when a specific recipient of a document is an ESL (i.e. a learner of English as a Second Language) user. In this case, the service's 'ESL' lens could map 'difficult' words and phrases in the document to their limited-vocabulary counterparts. The lens may even rewrite specific passages to convey their meaning using simpler phraseology, thus making the document more efficiently readable by the recipient. Identify when the recipient is a 'beginner' in terms of subject matter expertise. In such a scenario, the suitable service lens may try to eliminate specific terminology that is unintelligible to a layperson, and instead replace with the corresponding definitions from a glossary.

The following are use cases to better illustrate various aspects of the document services disclosed herein.

Kat, a young professional, has been asked to produce her first annual sales report since she joined her firm. The report is to be circulated to most of her extended team including senior management, and she wants to make sure she makes a great impression.

Word® has always been her favored authoring tool, and now Kat relies on Word® as her guide to authoring great content in accordance with the conventions at her firm. To get her going, Word® asks her to briefly describe what she is writing about, and who her intended audience may be. As she describes her target audience for Word®, she is given the option to customize the expectations of each segment of her audience (e.g. executive summaries for management, primary source data for peers, simple English for her audience in the Tokyo office, etc.). This step takes her less than a minute thanks to Word's smart defaults, and she is on her way.

To get Kat going, Word® begins by presenting Kat with a set of similar reports authored by others on her team. Once Kat has picked a favorite. Word® allows her to easily jump over the 'cold start hump' by importing the high-level structure of the document. Kat is able to make some minor changes to update the structure to reflect her own requirements. In under 5 minutes since she started, Kat now has a skeleton for her document.

Now, Kat notices that Word® is able to give her a real-time scorecard of how her document is coming across to her target audience, as well as a checklist of steps she needs to follow to get it ready for circulation. There isn't very much content in the document yet, but she realizes right away that she is missing an Executive Summary section. She adds it, and the first checkbox is ticked (progress!).

As she types, Kat sees a recommendations experience, as well as a real-time report on how their document reads. Through the process, Word® is playing back to them exactly how well their content is coming across, and what they can change in the document in order to achieve greater impact.

Once done with her major edits, Kat can now do a full pass over the document and respond to the critiques from Word®. She ends up reflowing some of their content into buffeted lists, as well as enriching the content with more data and connections (need to figure out exactly how).

Once Kat has published her annual report, the service now ensures that her diverse audience is able to most efficiently consume her document. Each recipient of Kat's report views the content not as a static block, but through a set of lenses that are personalized to their own style and abilities.

In another use-case, as the executive sponsor of the project, Mike is most interested in a short executive summary and the key data points that support the take home message. Once Mike loads up his custom lens, he sees a condensed version of Kat's report comprising of the executive summary, a bulleted list of highlights, and a set of supporting data. He is able to drill into the detailed view where he needs to, and is in and out of the document in a matter of minutes.

In another user-case, Hideo has a working knowledge of English, but still has a limited vocabulary, and sometimes struggles to understand complex sentences written by native speakers from the Chicago office. Over time however, he has come to rely on the ESL lens in Word®, which he immediately applies to Kat's report. The lens replaces some of the more complex words and passages in Kat's document with simple English vocabulary, allowing Hideo to more quickly go over the document. He finds himself not needing the dictionary even once through the whole process.

In another use-case, Ben, a peer of Kat's, suffers from mild dyslexia that often makes reading through documents a time consuming process for him. Once he loads up his service lens in Word®, it quickly converts the document into his preferred dyslexia font, making individual words easier to parse. It also reflows the document with customized line spacing, dramatically cutting down the amount of time it takes for him to read and understand its contents.

The service may learn from itself using algorithms that analyze behavior. The service may also support an extensibility model that will allow third party service providers to plug in their lenses. Companies and educational institutions may also build custom experiences. The service may improve at scale and with greater language coverage. DSSM in particular may support automated and algorithmic learning. Partners may choose to curate extremely high value verticals, an example being TEXTIO (www.textio.com) which can plug into the service to produce the perfect job posting to attract great candidates. The service may be extremely flexible when it comes to how vertical and horizontal lenses can interact together, so that there will be no need to choose just one lens. Combining lenses will create a multiplicity of consumption experiences. Lenses will also assist the author to target the right audience if they choose so at authoring time.

The signals available around the usage of a document, a post or an email can also be leveraged to form a lens profile. Exchange®, Yammer®, and the signals stored in the Graph can be leveraged to feedback into a lens profile. The service may understand hierarchy in an organization, the distribution of material, edits, tags, likes, forwards, etc. All of this signaling can be used to judge the impact of a document and to learn from it.

In addition, users can have their own, proprietary ranking based on their own, confidential preferences. The service could learn why a certain document was rated a certain way and can apply that knowledge to other documents. Over time this will keep improving and scaling the system, making it exponentially better. Through new user types self-identifying, the system will also scale out and become more broadly applicable.

In one example, enhanced document services can intelligently optimize and improve the readability of documents during authoring as well as consumption. The philosophy behind an intelligent document is that the content and presentation changes to match the context. A truly intelligent document will be able to know if the current author/consumer has a learning difficulty and make the appropriate adjustments to help make the content easier to understand.

For example, the document can adjust its font, line-height, and letter spacing to make it easier for individuals with dyslexia to read. Additionally, the document may be able to adjust its colors and/or backgrounds, or remove/reformat charts, tables, and lists, to emphasize readability and limit distractions. The service may improve readability across-the-board for all customers.

FIG. 9 illustrates computing system 901 that is representative of any system or collection of systems in which the various applications, services, scenarios, and processes disclosed herein may be implemented. Examples of computing system 901 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaining machines, virtual reality devices, smart televisions, smart watches and other wearable devices, as well as any variation or combination thereof.

Computing system 901 may be implemented as a single apparatus, system, or device or may be implemented in a distributed manner as multiple apparatuses, systems, or devices. Computing system 901 includes, but is not limited to, processing system 902, storage system 903, software 905, communication interface system 907, and user interface system 909. Processing system 902 is operatively coupled with storage system 903, communication interface system 907, and user interface system 909.

Processing system 902 loads and executes software 905 from storage system 903. Software 905 includes document lens process 906, which is representative of the processes discussed with respect to the preceding FIGS. 1-8, including document lens process 300. When executed by processing system 902 to enhance documents, software 905 directs processing system 902 to operate as described herein for at least the various processes, operational scenarios, and sequences discussed in the foregoing implementations. Computing system 901 may optionally include additional devices, features, or functionality not discussed for purposes of brevity.

Referring still to FIG. 9, processing system 902 may comprise a micro-processor and other circuitry that retrieves and executes software 905 from storage system 903. Processing system 902 may be implemented within a single processing device, but may also be distributed across multiple processing devices or sub-systems that cooperate in executing program instructions. Examples of processing system 902 include general purpose central processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which at least some of software 905 may be communicated internally or externally. Storage system 903 may be implemented as a single storage device, but may also be implemented across multiple storage devices or sub-systems co-located or distributed relative to each other. Storage system 903 may comprise additional elements, such as a controller, capable of communicating with processing system 902 or possibly other systems.

Software 905 may be implemented in program instructions and among other functions may, when executed by processing system 902, direct processing system 902 to operate as described with respect to the various operational scenarios, sequences, and processes illustrated herein. For example, software 905 may include program instructions for implementing enhanced document services.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software, virtual machine software, or other application software, in addition to or that include document lens process 906. Software 905 may also comprise firmware or some other form of machine-readable processing instructions executable by processing system 902.

In general, software 905 may, when loaded into processing system 902 and executed, transform a suitable apparatus, system, or device (of which computing system 901 is representative) overall from a general-purpose computing system into a special-purpose computing system customized to facilitate enhanced documents. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 909 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 909. In some cases, the input and output devices may be combined in a single device, such as a display capable of displaying images and receiving touch gestures. The aforementioned user input and output devices are well known in the art and need not be discussed at length here.

User interface system 909 may also include associated user interface software executable by processing system 902 in support of the various user input and output devices discussed above. Separately or in conjunction with each other and other hardware and software elements, the user interface software and user interface devices may support a graphical user interface, a natural user interface, or any other type of user interface.

Communication between computing system 901 and other computing systems (not shown), may occur over a communication network or networks (e.g. communication network 410) and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Certain inventive aspects may be appreciated from the foregoing disclosure, of which the following are various examples.

Example 1

A computing apparatus comprising: one or more computer readable storage media; a processing system operatively coupled with the one or more computer readable storage media; and program instructions stored on the one or more computer readable storage media for providing a document lens service that, when read and executed by the processing system, direct the processing system to at least: identify an end-user targeted to consume a productivity document being authored in a user interface to a productivity application; identify a document profile specific to the end-user indicative of a model document for the end-user to consume; and while the productivity document is being authored, surface suggestions in the user interface for aligning the productivity document with the model document.

Example 2

The computing apparatus of Example 1 wherein the program instructions further direct the processing system to at least: perform an evaluation of the productivity document against the document profile to identity deficiencies in the productivity document relative to the model document; and identify the suggestions for aligning the productivity document with the model document based at least in part on the deficiencies.

Example 3

The computing apparatus of Examples 1-2 wherein the deficiencies relate to actual characteristics of the productivity document that depart from model characteristics of the model document expressed in the document profile.

Example 4

The computing apparatus of Examples 1-3 wherein the model characteristics comprise word choice, font selection, paragraph length, line spacing, and content organization.

Example 5

The computing apparatus of Examples 1-4 wherein, to identify the end-user targeted to consume the productivity document, the program instructions direct the processing system to surface an input element in the user interface to obtain an identity of the end-user.

Example 6

The computing apparatus of Examples 1-5 wherein to identify the document profile specific to the end-user, the program instructions direct the processing system to select the document profile from a plurality of document profiles associated with a plurality of end-users using the identity of the end-user.

Example 7

The computing apparatus of Examples 1-6 wherein the set of document profiles comprises a public document profile and a private document profile for each end-user of the set of end-users and wherein the document profile comprises the public document profile for the end-user.

Example 8

The computing apparatus of Examples 1-5 wherein the productivity document comprises an email, wherein the productivity application comprises an email application, wherein the user interface comprises a compose view of the email, and wherein the input element comprises a recipient field in the compose view, and wherein to identify of the reader, the program instructions direct the processing system to obtain the identity of the reader from recipient information input into the recipient field.

Example 9

The computing apparatus of Examples 1-5 wherein the productivity document comprises a word processing document, wherein the productivity application comprises a word processing application, wherein the user interface comprises an editing view of the word processing document, and wherein the input element comprises a recipient field in the editing view, and wherein to identify of the reader, the program instructions direct the processing system to obtain the identity of the reader from recipient information input into the recipient field.

Example 10

One or more computer readable storage media having program instructions stored thereon that, when executed by a processing system, direct the processing system to at least: identify an end-user targeted to consume a productivity document being authored in a user interface to a productivity application; identify a document profile specific to the end-user indicative of a model document for the end-user to consume; and while the productivity document is being authored, surface suggestions in the user interface for aligning the productivity document with the model document.

Example 11

A method of operating a document lens service comprising: identifying an end-user targeted to consume a productivity document being authored in a user interface to a productivity application; identifying a document profile specific to the end-user indicative of a model document for the end-user to consume; and while the productivity document is being authored, surfacing suggestions in the user interface for aligning the productivity document with the model document.

Example 12

The method of Example 11 further comprising: performing an evaluation of the productivity document against the model document to identity deficiencies in the productivity document relative to the model document; and identifying the suggestions for aligning the productivity document with the model document based at least in part on the deficiencies.

Example 13

The method of Examples 11-12 wherein the deficiencies relate to actual characteristics of the productivity document that depart from model characteristics of the model document.

Example 14

The method of Examples 11-13 wherein the model characteristics comprise word choice, font selection, paragraph length, line spacing, and content organization.

Example 15

The method of Examples 11-14 wherein identifying the end-user targeted to consume the productivity document comprises surfacing an input element in the user interface to obtain an identity of the end-user.

Example 16

The method of Examples 11-15 wherein identifying the document profile specific to the end-user comprises selecting the document profile from a plurality of document profiles associated with a plurality of end-users using the identity of the end-user.

Example 17

The method of Examples 11-16 wherein the set of document profiles comprises a public document profile and a private document profile for each end-user of the set of end-users and wherein the document profile comprises the public document profile for the end-user.

Example 18

The method of Examples 11-17 wherein the productivity document comprises an email, wherein the productivity application comprises an email application, wherein the user interface comprises a compose view of the email, and wherein the input element comprises a recipient field in the compose view, and wherein to identify of the reader, the program instructions direct the processing system to obtain the identity of the reader from recipient information input into the recipient field.

Example 19

The method of Examples 11-18 wherein the productivity document comprises a word processing document, wherein the productivity application comprises a word processing application, wherein the user interface comprises an editing view of the word processing document, and wherein the input element comprises a recipient field in the editing view, and wherein to identify of the reader, the program instructions direct the processing system to obtain the identity of the reader from recipient information input into the recipient field.

Example 20

The method of Examples 11-20 further comprising: maintaining a document graph comprising graph information representative of actions taken by the end-user with respect to a plurality of documents having a plurality of characteristics; and developing the document profile for the end-user based at least in part on the graph information in the document graph.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:
1. A computing apparatus comprising:
one or more computer readable storage media;
a processing system operatively coupled with the one or more computer readable storage media; and
program instructions stored on the one or more computer readable storage media for providing a document lens service that, when read and executed by the processing system, direct the processing system to at least:
maintain a document graph comprising graph information representative of actions taken by a consumer with respect to a plurality of documents having a plurality of characteristics;
identify the consumer of a productivity document being authored by an author in a user interface to a productivity application, wherein the author is a different end-user than the consumer;
identify a document profile specific to the consumer indicative of a model document for the consumer to consume, wherein the document profile for the con- sumer is developed based at least in part on the graph information in the document graph;

identify at least one additional consumer of the productivity document, wherein the at least one additional consumer is different than the author and the consumer;

identify an additional document profile specific to the at least one additional consumer indicative of an additional model document for the at least one additional consumer to consume;

associate a segment of the productivity document with one or more of the consumer profile and the additional consumer profile; and while the productivity document is being authored by the author:

evaluate the productivity document against one or more of the model document and the additional model document to identify differences in the productivity document relative to one or more of the model document and the additional model document, wherein the differences relate to actual characteristics of the productivity document that depart from model characteristics of one or more of the model document and the additional model document expressed in one or more of the document profile and the additional document profile;

identify suggestions for aligning the productivity document with one or more of the model document and the additional model document based at least in part on the differences; and surface the suggestions in the user interface for aligning the productivity document with one or more of the model document and the additional model document.

2. The computing apparatus of claim 1 wherein the program instructions further direct the processing system to at least:
alter the productivity document with one or more of the suggestions.

3. The computing apparatus of claim 1 wherein the suggestions are selectable, and when selected, cause the productivity document to be altered.

4. The computing apparatus of claim 1 wherein the model characteristics comprise word choice, font selection, paragraph length, line spacing, and content organization.

5. The computing apparatus of claim 1 wherein, to identify the consumer, the program instructions direct the processing system to surface an input element in the user interface to obtain an identity of the consumer.

6. The computing apparatus of claim 5 wherein to identify the document profile specific to the consumer, the program instructions direct the processing system to select the document profile from a plurality of document profiles associated with a plurality of consumers using the identity of the consumer.

7. The computing apparatus of claim 6 wherein the set of document profiles comprises a public document profile and a private document profile for each consumer of the set of consumers and wherein the document profile comprises the public document profile for the consumer.

8. The computing apparatus of claim 5 wherein the productivity document comprises an email, wherein the productivity application comprises an email application, wherein the user interface comprises a compose view of the email, and wherein the input element comprises a recipient field in the compose view, and wherein to identify of the consumer, the program instructions direct the processing system to obtain the identity of the consumer from recipient information input into the recipient field.

9. The computing apparatus of claim 5 wherein the productivity document comprises a word processing document, wherein the productivity application comprises a word processing application, wherein the user interface comprises an editing view of the word processing document, and wherein the input element comprises a recipient field in the editing view, and wherein to identify of the consumer, the program instructions direct the processing system to obtain the identity of the consumer from recipient information input into the recipient field.

10. One or more computer readable storage media having program instructions stored thereon that, when executed by a processing system, direct the processing system to at least:

maintain a document graph comprising graph information representative of actions taken by a consumer with respect to a plurality of documents having a plurality of characteristics;

identify the consumer targeted to consume a productivity document being authored by an author in a user interface to a productivity application, wherein the author is a different end-user than the consumer;

identify a document profile specific to the consumer indicative of a model document for the consumer to consume, wherein the document profile for the consumer is developed based at least in part on the graph information in the document graph;

identify at least one additional consumer of the productivity document, wherein the at least one additional consumer is different than the author and the consumer;

identify an additional document profile specific to the at least one additional consumer indicative of an additional model document for the at least one additional consumer to consume;

associate a segment of the productivity document with one or more of the consumer profile and the additional consumer profile; and while the productivity document is being authored by the author:

evaluate the productivity document against one or more of the model document and the additional model document to identify differences in the productivity document relative to one or more of the model document and the additional model document, wherein the differences relate to actual characteristics of the productivity document that depart from model characteristics of one or more of the model document and the additional model document;

identify suggestions for aligning the productivity document with one or more of the model document and the additional model document based at least in part on the differences; and surface the suggestions in the user interface for aligning the productivity document with one or more of the model document and the additional model document.

11. A method of operating a document lens service comprising:

maintaining a document graph comprising graph information representative of actions taken by a consumer with respect to a plurality of documents having a plurality of characteristics;

identifying the consumer targeted to consume a productivity document being authored by an author in a user interface to a productivity application, wherein the author is a different end-user than the consumer;

identifying a document profile specific to the consumer indicative of a model document for the consumer to consume, wherein the document profile for the consumer is developed based at least in part on the graph information in the document graph;

identifying at least one additional consumer of the productivity document, wherein the at least one additional consumer is different than the author and the consumer;

identifying an additional document profile specific to the at least one additional consumer indicative of an additional model document for the at least one additional consumer to consume;

associating a segment of the productivity document with one or more of the consumer profile and the additional consumer profile; and while the productivity document is being authored by the author:

evaluating the productivity document against one or more of the model document and the additional model document to identify differences in the productivity document relative to one or more of the model document and the additional model document, wherein the differences relate to actual characteristics of the productivity document that depart from model characteristics of one or more of the model document and the additional model document;

identifying suggestions for aligning the productivity document with one or more of the model document and the additional model document based at least in part on the differences; and surfacing the suggestions in the user interface for aligning the productivity document with one or more of the model document and the additional model document.

12. The method of claim 11 further comprising:

altering the productivity document with one or more of the suggestions.

13. The method of claim 11 wherein the suggestions are selectable, and when selected, cause the productivity document to be altered.

14. The method of claim 11 wherein the model characteristics comprise word choice, font selection, paragraph length, line spacing, and content organization.

15. The method of claim 11 wherein identifying the consumer targeted to consume the productivity document comprises surfacing an input element in the user interface to obtain an identity of the consumer.

16. The method of claim 15 wherein identifying the document profile specific to the consumer comprises selecting the document profile from a plurality of document profiles associated with a plurality of consumers using the identity of the consumer.

17. The method of claim 16 wherein the set of document profiles comprises a public document profile and a private document profile for each consumer of the set of consumers and wherein the document profile comprises the public document profile for the consumer.

18. The method of claim 15 wherein the productivity document comprises an email, wherein the productivity application comprises an email application, wherein the user interface comprises a compose view of the email, and wherein the input element comprises a recipient field in the compose view, and wherein to identify of the consumer, the program instructions direct the processing system to obtain the identity of the consumer from recipient information input into the recipient field.

19. The method of claim 15 wherein the productivity document comprises a word processing document, wherein the productivity application comprises a word processing application, wherein the user interface comprises an editing view of the word processing document, and wherein the input element comprises a recipient field in the editing view, and wherein to identify of the consumer, the program instructions direct the processing system to obtain the identity of the consumer from recipient information input into the recipient field.

20. The method of claim 11 further comprising:

identifying a subset of the plurality of documents favored by the consumer based on the actions taken by the consumer with respect to the plurality of documents;

identifying a subset of the plurality of characteristics that the subset of the plurality of documents each have in common with each other; and populating the document profile with the subset of the plurality of characteristics.

* * * * *